United States Patent [19]
Idelson

[11] 3,779,754
[45] Dec. 18, 1973

[54] PHOTOGRAPHIC PROCESSES AND PRODUCTS EMPLOYING 5-HYDROXY-4-AZAPHENANTHRENYL PHTHALEINS AS OPTICAL FILTER AGENTS

[75] Inventor: Elbert M. Idelson, Newton Lower Falls, Mass.

[73] Assignee: Polaroid Corporation, Cambridge, Mass.

[22] Filed: Sept. 2, 1971

[21] Appl. No.: 177,513

[52] U.S. Cl. ............... 96/3, 96/29 D, 96/84 R, 260/326.14
[51] Int. Cl. ....... G03c 1/84, G03c 5/54, G03c 7/00
[58] Field of Search ............... 96/3, 29 D, 84 R

[56] References Cited
UNITED STATES PATENTS
3,702,244 11/1972 Bloom et al. ............... 96/3

*Primary Examiner*—Norman G. Torchin
*Assistant Examiner*—Alfonso T. Suro Pico
*Attorney*—Charles Mikulka et al.

[57] ABSTRACT

This invention relates to a class of phthalein indicator dyes useful as optical filter agents in photographic processes to protect a selectively exposed photosensitive material from further exposure during processing in the presence of indicident light. Such dyes comprise 3,3-disubstituted phthalides and 3,3-disubstituted naphthalides wherein the 3,3 substituents are para-hydroxy polycyclic aryl radicals possessing a nitrogen atom included in the ring system adjacent to the para-hydroxy group.

45 Claims, No Drawings

PHOTOGRAPHIC PROCESSES AND PRODUCTS EMPLOYING 5-HYDROXY-4-AZAPHENANTHRENYL PHTHALEINS AS OPTICAL FILTER AGENTS

BACKGROUND OF THE INVENTION

1. Field of the Invention

The present invention relates to novel chemical compounds, and more specifically, it relates to a new class of phthalein indicator dyes. In a particular aspect it relates to certain phthaleins useful as optical filter agents in photographic processes for protecting an exposed photosensitive material from post-exposure fogging during development in the presence of extraneous incident light and to such photographic uses.

2. Description of the Prior Art

A number of photographic prcesses by which images may be developed and viewed within seconds or minutes after exposure have been proposed. Such processes generally employ a processing composition which is suitably distributed between two sheet-like elements, the desired image being carried by one of said sheet-like elements. The resulting images may be in black-and-white, e.g., in silver, or in one or more colors. Processing may be conducted in or outside of a camera. The most useful of such processes are the diffusion transfer processes which have been proposed for forming silver or dye images, and several of these processes have been commercialized. Such processes have in common the feature that the final image is a function of the formation of an image-wise distribution of an image-providing reagent and the diffusion transfer of said distribution to or from the stratum carrying the final image, whether positive or negative.

U.S. Pat. No. 3,415,644 discloses a composite photosensitive structure, particularly adapted for use in reflection type photographic diffusion transfer color processes. This structure comprises a plurality of essential layers including, in sequence, a dimensionally stable opaque layer; one or more silver halide emulsion layers having associated therewith dye image-providing material which is soluble and diffusible, in alkali, at a first pH, as a function of the point-to-point degree of its associated silver halide emulsion's exposure to incident actinic radiation; a polymeric layer adapted to receive solubilized dye image-providing material diffusing thereto; a polymeric layer containing sufficient acidifying capacity to effect reduction of a processing composition from the first pH to a second pH at which the dye image-providing material is substantially nondiffusible; and a dimensionally stable transparent layer. This structure may be exposed to incident actinic radiation and processed by interposing, intermediate the silver halide emulsion layer and the reception layer, an alkaline processing composition providing the first pH and containing a light-reflecting agent, for example, titanium dioxide to provide a white background. The light reflecting agent (referred to in said patent as an "opacifying agent") also performs an opacifying function, i.e., it is effective to mask the developed silver halide emulsions and also acts to protect the photoexposed emulsions from postexposure fogging by light passing through the transparent layer if the photoexposed film unit is removed from the camera before image formation is complete.

In a preferred embodiment, the composite photosensitive structure includes a rupturable container, retaining the alkaline processing compositon having the first pH and light-reflecting agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually immobilized as a function of the point-to-point degree of the respective silver halide emulsion layer photoexposure, resulting in imagewise distributions of mobile dye image-providing materials adapted to transfer, by diffusion, to the reception layer to provide the desired transfer dye image. Subsequent to substantial dye image formation in the reception layer, a sufficient portion of the ions of the alkaline processing composition transfers, by diffusion, to the polymeric neutralizing layer to effect reduction in the alkalinity of the composite film unit to the second pH at which dye image-providing material is substantially nondiffusible, and further dye image-providing material transfer is thereby substantially obviated.

The transfer dye image is viewed, as a reflection image, through the dimensionally stable transparent layer against the background provided by the reflecting agent, distributed as a component of the processing composition, intermediate the reception layer and next adjacent silver halide emulsion layer. The thus-formed stratum effectively masks residual dye image-providing material retained in association with the developed silver halide emulsion layer subsequent to processing.

In the copending U.S. Pat. application Ser. No. 786,352 of Edwin H. Land, filed Dec. 23, 1968, now abandoned, and Ser. No. 101,968 filed Dec. 28, 1970, now U.S. Pat. No. 3,647,437, in part a continuation of Ser. No. 786,352, an organic light-absorbing reagent (or optical filter agent), such as a dye, which is present at a light-absorbing species at the first pH and which may be converted to a substantially non-light-absorbing species at the second pH is used in conjunction with the light-reflecting agent to protect the selectively exposed silver halide emulsions from post-exposure fogging when development of the photoexposed emulsions is conducted in the presence of extraneous incident actinic radiation impinging on the transparent layer of the film unit. When such a dye is employed, it is preferred that the dye selected possess a relatively high pKa so that it will be in a light-absorbing form during the initial stages of processing, and also capable of being rendered substantially non-light absorbing within a relatively brief interval as the pH subsequent to substantial image formation is reduced.

Copending U.S. Pat. application Ser. No. 103,392 filed Jan. 4, 1971, now U.S. Pat. No. 3,702,245, discloses various pH-sensitive dyes derived from certain hydroxy-substituted carbocyclic aryl compounds, viz., particular phenols and naphthols which due to their high pKa and spectral absorption characteristics are useful as optical filter agents for absorbing incident radiation actinic to selectively exposed photosensitive materials within a predetermined wavelength range in the longer wavelength region of the visible spectrum. Among the dyes disclosed therein are phenol and 1-naphthol phthaleins wherein the p-hydroxyphenyl or p-hydroxynaphthyl radicals are substituted with a hydrogen-bonding group on a carbon atom adjacent to the functional hydroxy group to raise the pKa. These phenol and 1-naphthol phthaleins form the subject matter of copending U.S. Pat. applications Ser. Nos. 103,864 and 103,865, respectively both filed Jan. 4, 1971.

The association of two atoms through hydrogen to form a hydrogen bond between or within molecules is well known. When hydrogen is attached to an electronegative atom, for example, O or N, the resultant bond is polarized. If directed toward another atom (M) with an unshared pair of electrons, the hydrogen acts as a bridge between the atoms (O-H . . . M) due to the electrostatic attraction to both atoms between which the hydrogen proton can be transferred. In the phenol and naphthol phthaleins of the two aforementioned applications, an intramolecular hydrogen bond is formed between the p-hydroxy group and the hydrogen-bonding group substituted on an adjacent carbon atom.

The present invention is concerned with another class of phthalein indicator dyes possessing a high pKa which dyes also are among those disclosed as optical filter agents in aforementioned application Ser. No. 103,392.

SUMMARY OF THE INVENTION

It is therefore the primary object of the present invention to provide a novel class of phthalein indicator dyes.

It is another object of the present invention to provide products, compositions and processes for the development of photosensitive materials in which the novel phthalein indicator dyes are used.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, there is provided a novel class of phthalein indicator dyes derived from certain hydroxy-substituted polycyclic aryl compounds having a nitrogen atom included in the ring system as exemplified by 5-hydroxy-4-azaphenanthrene. These dyes include both phthalides and naphthalides and will be defined with greater particularity hereinafter.

The indicator dyes of the present invention, like phthalein indicators, in general, possess spectral absorption characteristics which are reversibly alterable in response to changes in environmental pH. These dyes possess a highly colored form capable of absorbing visible radiation in alkaline media at a first pH value above their respective pKa and a substantially colorless form, i.e., a form which is substantially non-light-absorbing in the visible spectrum in less alkaline media at a second pH value below their resepctive pKa. By pKa is meant the pH at which about 50 percent of the dye is present in its light-absorbing form and about 50 percent is present in its non-light-absorbing form.

It will be appreciated that such compounds will find utility in titrations and other analytical procedures where phthalein indicator dyes are commonly employed, for example, to measure changes in pH value as reflected by the change in color of the dye from one color to another or from colored to colorless or vice versa. The indicator dyes of the present invention, however, compared to conventional phthaleins of hydroxy-substituted compounds, such as, simple phenol phthalein and 1-naphthol phthalein possess a higher pKa which render them useful as optical filter agents in photographic processes performed under alkaline conditions, and especially in photographic processes employing highly alkaline media.

For a fuller understanding of the nature and objects of the invention, reference should be had to the following detailed description.

DESCRIPTION OF THE PREFERRED EMBODIMENTS

According to the present invention, it has been found that phthalein indicator dyes having a high pKa may be obtained without adding substituents, i.e., without having to substitute hydrogen-bonding groups on the p-hydroxy radicals of the dye. This may be achieved by utilizing hydroxy-substituted polycyclic aryl compounds having a nitrogen atom included in the ring system, provided the nitrogen atom is in a position to give a group,

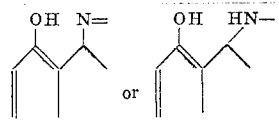

As compared to phenol and 1-naphthol compounds containing a cyclic substituent subject to rotation, such as,

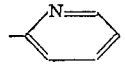

hydrogen bonding is particularly effective in the compounds of the present invention since the N atom of the polycyclic molecule is in fixed position relative to the functional hydroxy group. Besides the increase in pKa resulting from the hydrogen bond thus formed, these dyes are capable of absorbing radiation over a relatively broad wavelength range in the visible spectrum. Because of their spectral absorption characteristics and because they are colored at a comparatively high pH, they are especially useful as optical filter agents in photographic processes conducted under highly alkaline conditions for affording protection of a selectively exposed photosensitive material from incident actinic radiation in the visible spectrum.

The indicator dyes of the present invention may be defined as phthaleins selected from 3,3-disubstituted phthalides and 3,3-disubstituted naphthalides wherein the 3,3 substituents are polycyclic aryl radicals containing the group,

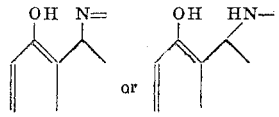

said radicals being bonded to the phthalide or naphthalide by a carbon atom para to the —OH of said group. Illustrative of the aforementioned groups are

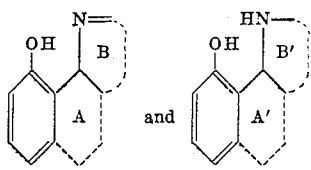

wherein A and A' comprise a ring, the atoms which are necessary to complete said ring being saturated or unsaturated and said ring being carbocyclic or heterocyclic, and preferably, containing 5 or 6 members; and B and B' comprise a ring system containing at least 5 members.

Typical of the indicator dyes of the present invention are those represented by the formula:

(I)
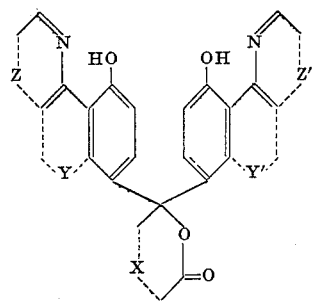

wherein Y and Y', the same, represent the atoms necessary to complete a ring having 5 or 6 members; Z and Z', the same, represent the atoms necessary to complete a ring system having at least 5 members and X represents the atoms necessary to complete a ring-closing moiety selected from a phthalide and a naphthalide.

The indicator dyes defined above and as represented in the aforegoing formula may contain substituents on the polycyclic aryl radicals and/or ring-closing moiety as may be desired which do not interfere with the function of the dye for its selected ultimate use. Where it is desired that the indicator dye be substantially immobile or non-diffusible in the processing solution, it may be substituted with a bulky group, such as, a long chain substituent, e.g., dodecyloxy, hexadecyl or dodecylphenyl. Also, it may be substituted with solubilizing groups, e.g., carboxy or sulfo to adjust the solubility in a given solution. Because of the convenience in preparation, the dyes of the present invention preferably are symmetrical, i.e., bis phthalides and bis naphthalides wherein the two polycyclic aryl radicals are the same, i.e., they contain the same substituents in the same position.

Typical substituents include branched or straight chain alkyl, such as, methyl, ethyl, isopropyl, n-butyl, t-butyl, hexyl, octyl, dodecyl, hexadecyl, octadecyl and eicosanyl; aryl, such as, phenyl, 2-hydroxyphenyl, and naphthyl; alkaryl, such as, benzyl, phenethyl, phenylhexyl, p-octylphenyl, p-dodecylphenyl; alkoxy, such as, methoxy, ethoxy, butoxy, 1-ethoxy-2-($\beta$-ethoxyethoxy), dodecyloxy and octadecyloxy; aryloxy, such as phenoxy, benzyloxy, naphthoxy; alkoxyalkyl, such as, methoxyethyl, dodecyloxyethyl; halo such as, fluoro, bromo, and chloro; trifluoralkyl, such as, trifluoromethyl, mono- and bis- trifluoromethyl carbinol; sulfonamido; sulfamoyl; acyl and its derivatives, aminomethyl; amido; sulfonyl; sulfo; cyano; nitro; amino including mono-and disubstituted amino, e.g., N-ethyl amino and N,N'dimethylamino; carboxy; and hydroxyl.

Specific examples of indicator dyes within the scope of the present invention are as follows:

(1)
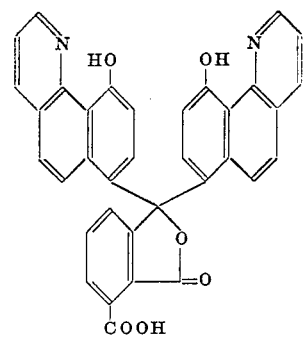

(2)
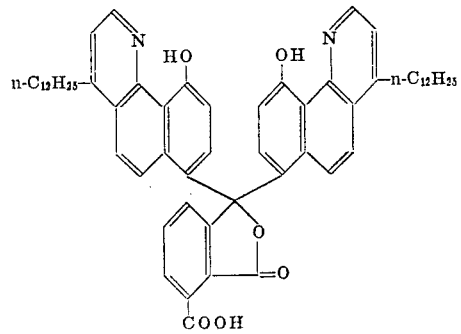

(3)
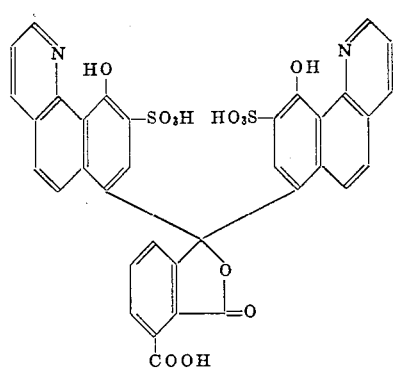

(4)
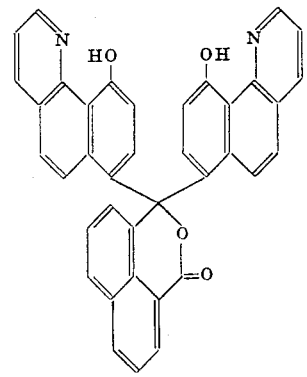

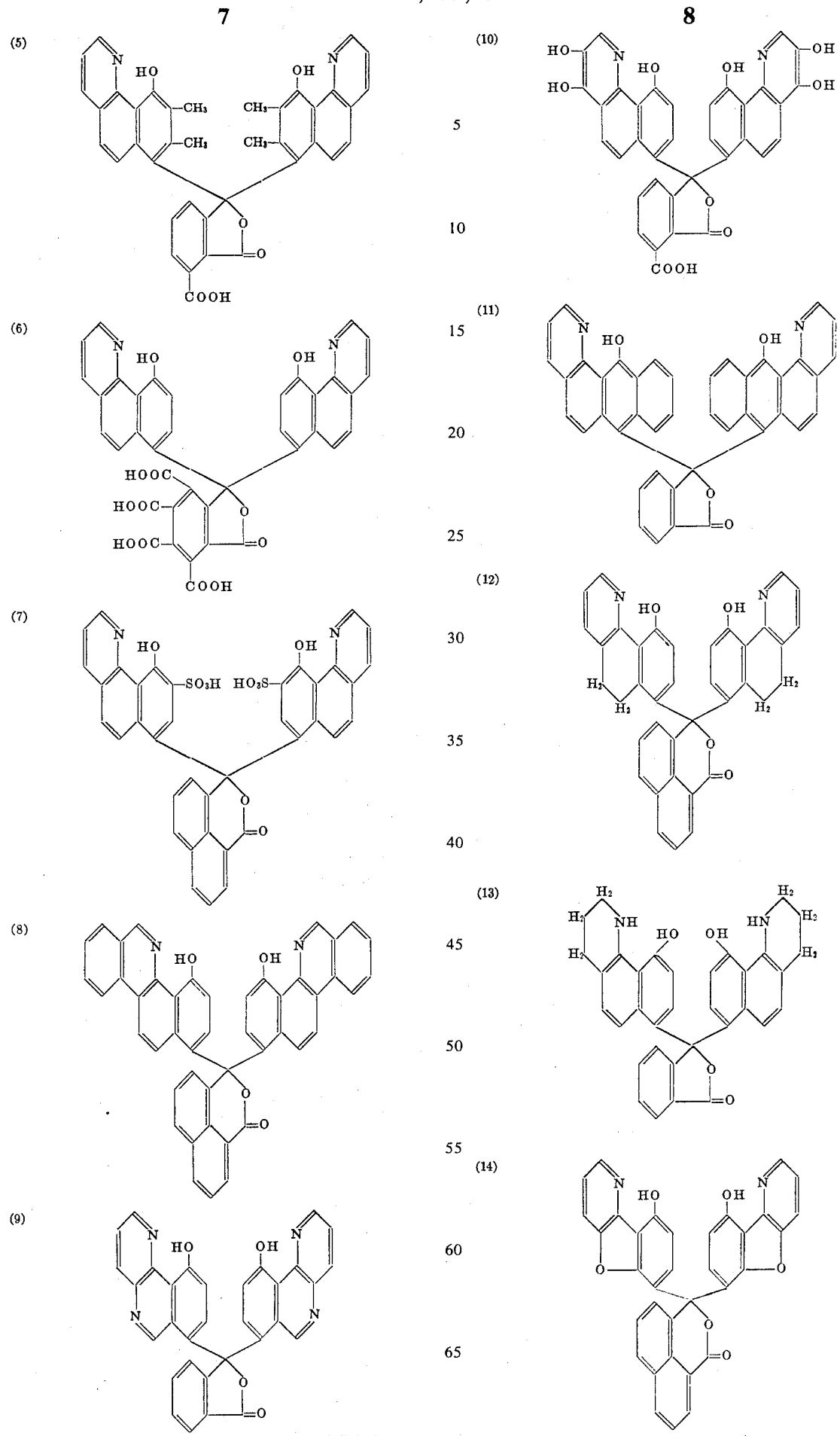

(15)
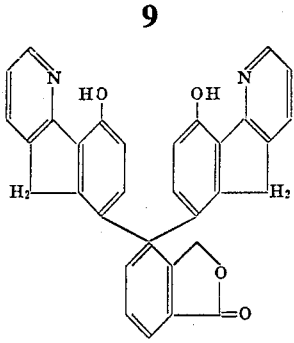

(16)
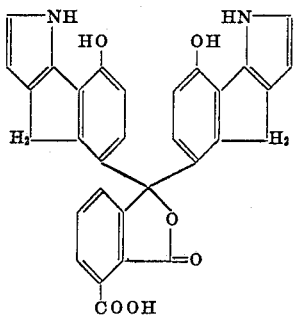

(17)
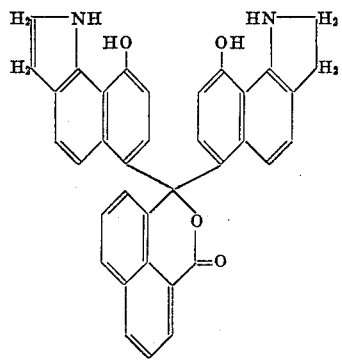

(18)
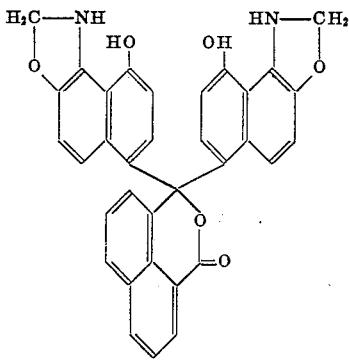

The indicator dyes of the present invention may be prepared in a conventional manner by reacting the selected hydroxy-substituted polycyclic aryl compound and the phthalic or naphthalic acid reagent at elevated temperatures in the presence of a suitable catalyst, such as, a Lewis acid catalyst as conventionally used in Friedel Craft reactions, e.g., aluminum chloride, ferric chloride, stannic chloride, boron trifluoride and zinc chloride. Ordinarily, an inert organic solvent capable of dissolving the reactants also is employed, e.g., nitrobenzene.

The phthalic or naphthalic acid reagent selected to ultimately form the ring-closing moiety may be the acid, the acid anhydride or the acid chloride. The terms "phthalic acid reagent" and "naphthalic acid reagent" as used herein are intended to include the corresponding anhydrides and acid chlorides. These reagents may be substituted, with solubilizing groups, such as, carboxy, e.g., hemimellitic acid; with long chain substituents to adjust the mobility of the final dye, e.g., sulfonamido containing a long chain alkyl group ($-NH-SO_2-n-C_{16}H_{33}$) or with other substituents as may be desired.

Another method of preparing these phthalein indicator dyes comprises reacting the selected hydroxy-substituted polycyclic aryl compound with phthalaldehydic or naphthalaldehydic acid, which acids may contain substituents in the presence of a mild acid catalyst to yield the corresponding (na)phthalidyl-substituted intermediate which is then oxidized by treating with dichlorodicyanoquinone or other suitable oxidizing agent. The oxidized intermediate is then reacted with another mole of polycyclic aryl compound to yield the desired dye. This method of preparing certain phthalein indicator dyes forms the subject matter of copending U.S. Pat. application Ser. No. 108,662 filed Jan. 21, 1971.

As noted above, the hydroxy-substituted polycyclic aryl compounds used as the starting materials in these methods contain the group,

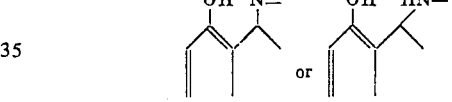

Illustrative compounds include:

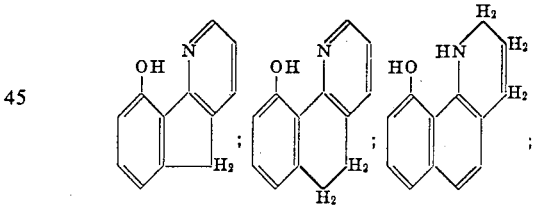

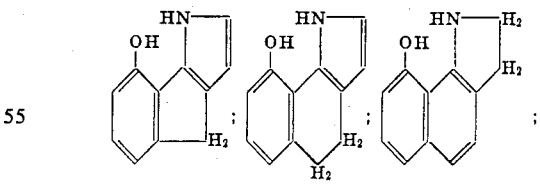

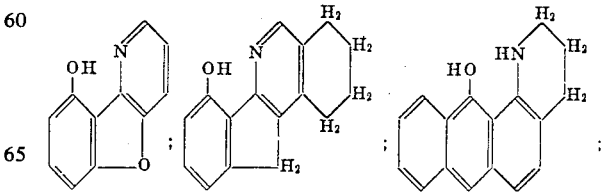

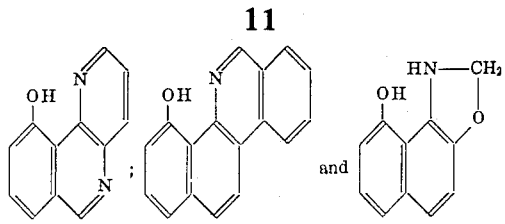

It will be appreciated that the aryl compounds used as the starting material may contain substituents as may be desired in the complete dye, provided the carbon atom para to the hydroxy group is unsubstituted and thus, available for reaction with the selected acid. If desired, substituents may be substituted on the completed dye, e.g., —SO$_3$H groups.

The following Examples are given to further illustrate the present invention and are not intended to limit the scope thereof.

EXAMPLE 1

Preparation of the compound of Formula (1):

19.5 grams of 5-hydroxy-4-azaphenanthrene was dissolved in 60 ml. of nitromethane, in a flame dried, three-neck flask under dry (P$_2$O$_5$) nitrogen with stirring. To this light yellow solution was added 8 grams of fresh aluminum chloride in small portions. The solution turned more orange and some precipitation took place. To this solution was added 2.105 grams of hemimellitic anhydride acid chloride; the solution turned a reddish orange. 20 ml. of nitrobenzene was then added, and the solution was heated with stirring on an oil bath at 40°C. After 6 hours, the solution turned greenish in color. To this solution was added an additional 1.95 grams of 5-hydroxy-4-azaphenantrene, the reaction was then heated at 60°C. with stirring for one hour. An emerald green color developed. To this solution, 0.72 ml. of acetic anhydride was slowly added, dropwise; the reaction was heated at 60°C. with stirring for 48 hours. The reaction was followed by T. L. C. [chloroform/methanol 1:1 on silica gel]. Indicator was detected with 5 percent sodium hydroxide in 20 percent aqueous ethanol. The reaction mixture was then poured into ice (~100 g.) with stirring and 100 ml. of 5 percent hydrochloric acid was added. The flask was washed with methanol and the methanol combined with the water solution. The solution was then steam distilled for 4 hours to remove the methanol, nitromethane, and nitrobenzene. The aqueous solution was then filtered. The residue solid by T. L. C. was largely product (>80 percent by weight). The filtrate contained only a small amount of indicator. The solid was dissolved in methylene chloride and evaporated onto silica gel. This was then eluted on a silica gel column with chloroform and 10 percent aqueous methanol to yield the indicator dye. Some of the indicator became absorbed on the column. This was soxlet extracted with chloroform for 24 hours. Total yield of the title compound was 1.05 grams as a light yellow solid.

EXAMPLE 2

Preparation of the compound of formula (3):

In a 100 ml. three-neck flask under nitrogen 1 g. of the product of Example 1 above was dissolved in small portions into 50 ml. of 20 percent fuming sulfuric acid with stirring. The reaction solution turned a very dark emerald green. After 2 hours of stirring at room temperature T. L. C. [methanol/chloroform on silica gel] showed no starting material. The solution was then carefully poured onto 200 g. of ice and the flask washed with 100 ml. of water. The aqueous solution was filtered to give a yellow solid which was slurried with a small amount of methanol, filtered and dried to yield 670 mg. of the title compound. An additional 200 mg. of product precipitated from the aqueous solution overnight. Melting point >180°C. (dec.).

The 5-hydroxy-4-azaphenanthrene used in Example 1 above was prepared in accordance with the procedure described in Helv. Chem. Acta, Vol. 27, p. 1461 (1944).

As noted above, the indicator dyes of the present invention have a relatively high pKa as compared to conventional phthaleins of hydroxy-substituted compounds, such as, phenol and 1-naphthol phthaleins. For example, the pKa values measured for the indicator dyes of Examples 1 and 2 were 13.8 and 13.9, respectively. In comparison, 1-naphtholphthalein has two pKa's, one at about 7 and a second at about 8. Phenol phthalein and phenol 7-carboxy phthalein both have pKa's of about 9.6.

The pH sensitive indicator dyes of the present invention may be used as optical filter agents in any photographic process including conventional tray processing and diffusion transfer photographic techniques. In such processes, the dye or dyes during development of a selectively exposed photosensitive material will be in a position and in a concentration effective to absorb a given level of non-selective radiation incident on and actinic to the photosensitive material. The dyes may be initially disposed in the film unit, for example, in a layer(s) coextensive with one or both surfaces of the photosensitive layer. Where selective exposure of the photosensitive material is made through a layer containing the indicator dye, then the dyes should be in a non-light-absorbing form until the processing solution is applied. Alternately, the dyes may be initially disposed in the processing composition in their light-absorbing form, for example, in the developing bath in tray processing on in the layer of processing solution distributed between the photosensitive element and the superposed image-receiving element (or spreader sheet) in diffusion transfer processing. The particular indicator dye or dyes selected should have an absorption spectrum corresponding to the sensitivity of the photosensitive layer, so as to afford protection over the predetermined wavelength range required by the particular photosensitive material employed and should have a pka such that they are in their colored form, i.e., light-absorbing form at the pH at which the photographic process is performed. Most commercially useful photographic processes are performed under alkaline conditions. Diffusion transfer processes, for example, usually employ highly alkaline processing solutions having a pH in excess of 12.

In photographic processes where the optical filter agent is retained in a stratum through which the final image is to be viewed, the color of the indicator dye may be discharged subsequent to image formation by adjusting the pH of the system to a value at which the dye is substantially non-light absorbing in the visible spectrum. In photographic processes performed at an alkaline pH, the optical filter agent, such as, a dye or dyes of the present invention are rendered substantially colorless by reducing the environmental pH. In processes where the optical filter agent is removed or separated from the layer containing the final image or retained in a layer that does not interfere with viewing of the final image, it is unnecessary to convert the indicator dye to its non-light-absorbing form, though the color may be discharged if desired.

The concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. It has been found, by interposing neutral density (carbon containing) filters over a layer of titanium dioxide, that a transmission density of approximately 6.0 from said neutral density filters was effective to prevent fogging of a diffusion transfer multicolor film unit of the type described in said U.S. Pat. No. 3,415,644 having a transparent support layer and an Equivalent ASA Exposure Index of approximately 75, when processed for one minute in 10,000 foot candles of color corrected light, a light intensity approximating the intensity of a noon summer sun. The transmission density required to protect such a film unit under the stated conditions may also be expressed in terms of the "system" transmission density of all the layers intermediate the silver halide layer(s) and the incident light; the "system" transmission density required to protect color film units of the aforementioned type and photographic speed has been found to be on the order of 7.0 to 7.2. Lesser levels of optical transmission density would, of course, provide effective protection for shorter processing times, lesser light intensities and/or films having lower exposure indices. The transmission density and the indicator dye concentration necessary to provide the requisite protection from incident light may be readily determined for any photographic process by following the above described procedure or obvious modifications thereof.

Since most commercial photographic processes employ photosensitive materials sensitive to and exposable by actinic radiation throughout the visible spectrum, e.g., black-and-white panchromatic silver halide emulsions and multilayer silver halide emulsion elements, it is preferred to use a second dye(s) in conjunction with the subject dye(s) that has a principal absorption in a second and at least partially different predetermined wavelength range such that the combination of dyes will afford protection from non-selective incident actinic radiation over the range of 400 to 700 nm. The second dye employed may be non-color-changing but preferably, is also pH sensitive, i.e., has reversibly alterable spectral absorption characteristics in response to changes in the environmental pH so that it may be rendered light-absorbing or non-light-absorbing as desired. Illustrative of such dyes are phthaleins derived from indoles, such as, indole phthalein. The second dye also may be initially present in the film unit or in the processing composition as discussed above either together with or separate from the subject dyes and subsequent to processing may be removed from the film unit or retained within the film structure, provided it is in a form or position such that it does not interfere with viewing of the image produced.

The dyes of the present invention are especially useful as optical filter agents in diffusion transfer processes, for example, those employing composite diffusion transfer photosensitive elements including a film pack or roll wherein superposed photosensitive and image-receiving elements are maintained as a laminate after formation of the final image. Such elements include at least one transparent support to allow viewing of the final image without destroying the structural integrity of the film unit. Preferably, the support carrying the photosensitive layer(s) is opaque and the support carrying the image-receiving layer is transparent and selective photoexposure of the photosensitive layer(s) and viewing of the final image both are effected through the latter support. The final image is viewed as a reflection print, i.e., by reflected light, provided by a reflecting agent initially disposed in the processing composition applied and maintained intermediate the image-receiving and next adjacent photosensitive layer or by a preformed layer of reflecting agent initially positioned intermediate the image-receiving and next adjacent photosensitive layer. It will be understood that a preformed reflecting layer, while it should be capable of masking the photosensitive layer(s) subsequent to image formation, should not interfere with selective photoexposure of the photosensitive material prior to processing.

When utilizing reflection-type composite film units, the indicator dye or dyes employed as the optical filter agent(s) may be positioned initially in a layer of the film unit, e.g., in a layer between the image-receiving and next adjacent photosensitive layer through which photoexposure is effected provided it is incorporated under conditions, i.e., at a pH such that it will not absorb actinic radiation intended to selectively expose the photosensitive material to form a latent image therein. For example, the optical filter agent may be in a layer coated over either the image-receiving layer or the next adjacent photosensitive layer and should remain substantially non-light-absorbing until a processing composition is applied providing a pH at which the indicator dye is capable of being rapidly converted to its light-absorbing form to provide light protection when the film unit is removed from the camera. Rather than being initially disposed in the film unit, the indicator dye may be initially present in the processing composition applied intermediate the image-receiving and next adjacent photosensitive layer subsequent to photoexposure. The dye, when initially disposed in the processing composition, will be in its light-absorbing form.

The dyes selected as optical filter agents should exhibit at the initial pH of the processing, maximum spectral absorption of radiation at the wavelengths to which the film unit's photosensitive silver halide layer or layers are sensitive, and preferably, should be substantially immobile or non-diffusible in the alkaline processing composition in order to achieve optimum efficiency as a radiation filter and to prevent diffusion of filter agent into layers of the film unit where its presence may be undesirable. Recognizing that the filter agent absorption will detract from image-viewing characteristics by contaminating reflecting pigment background, the selected agents should be those exhibiting major spectral absorption at the pH at which processing is effected and minimal absorption at a pH below that which obtains during transfer image formation. Accordingly, the selected optical filter agent or agents should possess a pKa below that of the processing pH and above that of the environmental pH subsequent to transfer image formation.

As discussed previously, the concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. In the processes where the indicator dye or dyes selected as optical filter agents are used in conjunction with a reflecting agent or agents, the optical filter agents and reflecting agents together should possess the optical transmission density necessary to protect the photosensitive material for the particular photographic process. The optimum concentration of optical filter agent(s) or filter agent(s) together with reflecting agent(s) may be readily determined empirically for each photographic system.

While substantially any reflecting agent may be employed for the layer of reflecting agent, either preformed or applied as a component of the processing composition, it is preferred to select an agent that will not interfere with the color integrity of the dye transfer image, as viewed by the observer, and, most preferably, an agent which is aesthetically pleasing to the viewer and does not provide a background detracting from the information content of the image. Particularly desirable reflecting agents will be those providing a white background, for viewing the transfer image, and specifically those conventionally employed to provide background for reflection photographic prints and, especially, those agents possessing the optical properties desired for reflection of incident radiation.

As examples of reflecting agents, mention may be made of barium sulfate, zinc sulfide, titanium dioxide, barium stearate, silver flake, silicates, alumina, zirconium oxide, zirconium acetyl acetate, sodium zirconium sulfate, kaolin mica, and the like.

Illustrative of the photographic use of the indicator dyes of the present invention as optical filter agents, a photographic film unit may be prepared by coating, in succession, on a gelatin subbed, 4 mil. opaque polyethylene terephthalate film base, the following layers:

1. a layer of the cyan dye developer 1,4-bis-($\beta$-[hydroquinonyl-$\alpha$-methyl]-ethylamino)-5,8-dihydroxy-anthraquinone dispersed in gelatin and coated at a coverage of about 80 mgs./ft.$^2$ of dye and about 100 mgs./ft.$^2$ of gelatin;

2. a red-sensitive gelatino-silver iodobromide emulsion coated at a coverage of about 225 mgs./ft.$^2$ of silver and about 50 mgs./ft.$^2$ of gelatin;

3. a layer of the acrylic latex sold by Rohm and Haas Co., Philadelphia, Pa., U.S.A., under the trade designation AC-61 and polyacrylamide coated at a coverage of about 150 mgs./ft.$^2$ of AC-61 and about 5 mgs./ft.$^2$ of polyacrylamide;

4. a layer of the magenta dye developer 2-(p-[$\beta$-hydroquinonylethyl]-phenylazo)-4-isopropoxy-1-naphthol dispersed in gelatin and coated at a coverage of 70 mgs./ft.$^2$ of dye and about 120 mgs./ft.$^2$ of gelatin;

5. a green-sensitive gelatino-silver iodobromide emulsion coated at a coverage of about 120 mgs./ft.$^2$ of silver and 60 mgs./ft.$^2$ of gelatin;

6. a layer comprising the acrylic latex sold by Rohm and Haas Co. under the trade designation B-15 and polyacrylamide coated at a coverage of about 100 mgs./ft.$^2$ of B-15 and about 10 mgs./ft.$^2$ of polyacrylamide;

7. a layer of the yellow dye developer 4-(p-[$\beta$-hydroquinonylethyl]-phenylazo)-3-(N-n-hexyl-carboxamido)-1-phenyl-5-pyrazolone and the auxiliary developer 4'-methylphenyl hydroquinone dispersed in gelatin and coated at a coverage of about 50 mgs./ft.$^2$ of dye, about 15 mgs./ft.$^2$ of auxiliary developer and 50 mgs./ft.$^2$ of gelatin;

8. a blue-sensitive gelatino-silver iodobromide emulsion coated at a coverage of about 75 mgs./ft.$^2$ of silver and about 75 mgs./ft.$^2$ of gelatin; and 9. a layer of gelatin coated at a coverage of about 50 mgs./ft.$^2$ of gelatin.

Then a transparent 4 mil. polyethylene terephthalate film base may be coated, in succession, with the following illustrative layers:

1. a 7:3 mixture, by weight, of polyethylene/maleic acid copolymer and polyvinyl alcohol at a coverage of about 1400 mgs./ft.$^2$, to provide a polymeric acid layer;

2. a graft copolymer of acrylamide and diacetone acrylamide on a polyvinyl alcohol backbone in a molar ratio of 1:3.2:1 at a coverage of about 800 mgs./ft.$^2$, to provide a polymeric spacer layer; and 3. a 2:1 mixture, by weight, of polyvinyl alcohol and poly-4-vinylpyridine, at a coverage of about 900 mgs./ft.$^2$ and including about 20 mgs./ft.$^2$ phenyl mercapto tetrazole, to provide a polymeric image-receiving layer.

The two components thus prepared may then be taped together in laminate form, at their respective edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising:

Water — 100 cc.
Potassium hydroxide — 11.2 gms.
Hydroxyethyl cellulose (high viscosity) [commercially available from Hercules Powder Co., Wilmington, Delaware, under the trade name Natrasol 250 ]— 3.4 gms.
N-phenethyl-$\alpha$-picolinium bromide — 2.7 gms.
Benzotriazole — 1.15 gms.
Titanium dioxide — 50.0 gms.

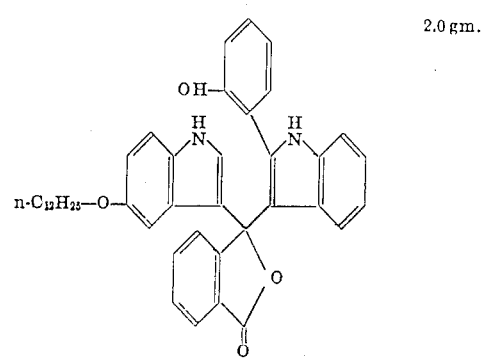

2.0 gm.

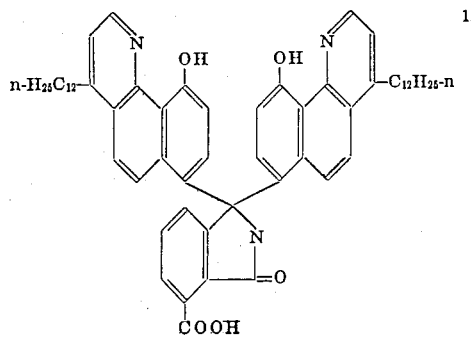

1.0 gm.

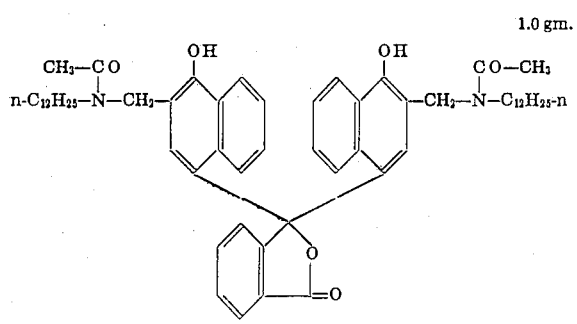

1.0 gm.

may then be fixedly mounted on the leading edge of each of the laminates, by pressure-sensitive tapes interconnecting the respective containers and laminates, such that, upon application of compressive pressure to a container, its contents may be distributed, upon rupture of the container's marginal seal, between the polymeric image-receiving layer and next adjacent gelatin layer.

The photosensitive composite film units may be exposed through step wedges to selectively filter radiation incident on the transparent polyethylene terephthalate layer and processed by passage of the exposed film units through appropriate pressure-applying members, such as suitably gapped, opposed rolls, to effect rupture of the container and distribution of its contents. During processing, the multicolor dye transfer image formation may be viewed through the transparent polyethylene terephthalate layer against the titanium dioxide background provided by distribution of the pigment containing processing composition between the polymeric image-receiving layer and gelatin layer 9 of the photosensitive component. The film unit may be exposed to incident light and the formation of the image may be viewed upon distribution of the processing composition by reason of the protection against incident radiation afforded the photosensitive silver halide emulsion layers by the optical filter agents and by reason of the effective reflective background afforded by the titanium dioxide.

The spectral absorption characteristics of the indicator dye prepared in Example 1 above are graphically illustrated in FIG. 13 of the aforementioned copending application Ser. No. 103,392 which graph represents the optical transmission density, i.e., absorbance of the dye measured on a logarithm scale over the wavelength range of 350 nm. to 750 nm. in aqueous alkaline solution at a pH substantially above its pKa.

The film unit detailed above is similar to that shown in FIG. 2 and related FIGS. 3-4 of aforementioned copending U. S. Pat. application Ser. No. 101,968. The negative component of the film unit including the photosensitive strata and associated dye-image-forming material; the positive component including the timing, neutralizing and dyeable layers; and the processing composition including its components, such as, the alkaline material and various addenda are described in detail in application Ser. No. 101,968. For convenience, the specification of this application is specifically incorporated herein.

Besides the above photosensitive element, the dyes of the present invention may be employed in composite photosensitive elements, in general, where the dyeable stratum along with any associated layers may be contained together with the photosensitive strata as a unitary film unit which may be termed an integral negative-positive film unit comprising a negative component including the aforementioned essential layers and a positive component including at least the dyeable stratum in which the color transfer image is to be formed. The essential layers are preferably contained on a transparent dimensionally stable layer or support member positioned closest to the dyeable stratum so that the resulting transfer image is viewable through this transparent layer. Most preferably another dimensionally stable layer which may be transparent or opaque is positioned on the opposed surface of the essential layers so that the aforementioned essential layers are sandwiched or confined between a pair of dimensionally stable layers or support members, at least one of which is transparent to permit viewing therethrough of a color transfer image obtained as a function of development of the exposed film unit in accordance with the known color diffusion transfer processes. It will be appreciated that all of these film units, like the specific one detailed above, may optionally contain other layers performing specific desired functions, e.g., spacer layers, pH-reducing layers, etc.

Examples of such integral negative-positive film units for preparing color transfer images viewable without separation are those described and claimed in aforementioned U. S. Pat. No. 3,415,644 and in U. S. Pat. Nos. 3,415,645, 3,415,646, 3,473,925, and 3,573,043.

In general, the film units of the foregoing description, e.g., those described in the aforementioned patents and/or copending applications, are exposed to form a developable image and thereafter developed by applying the appropriate processing composition to develop exposed silver halide and to form, as a function of development, an imagewise distribution of diffusible dye image-providing material which is transferred, at least in part by diffusion, to the dyeable stratum to impart thereto the desired color transfer image, e.g., a positive color transfer image. Common to all of these systems is the provision of a reflecting layer between the dyeable stratum and the photosensitive strata to mask effectively the latter and to provide a background for viewing the color image contained in the dyeable stratum, whereby this image is viewable without separation, from the other layers or elements of the film unit. As discussed previously, in some embodiments this reflecting layer is provided prior to photoexposure, e.g., as a preformed layer included in the essential layers of the laminar structure comprising the film unit, and in others it is provided at some time thereafter, e.g., by including a suitable light-reflecting agent, for example, a white pigment, such as, titanium dioxide, in the processing composition. As an example of such a preformed layer, mention may be made of that disclosed in the copending applications of Edwin H. Land, Ser. Nos. 846,441, filed July 31, 1969, and 3,645, filed Jan. 19, 1970 and now U. S. Pat. Nos. 3,615,421 and 3,620,724, respectively. The reflecting pigment may be generated in situ as is disclosed in the copending applications of Edwin H. Land, Ser. Nos. 43,741 and 43,742, both filed June 5, 1970 and now U. S. Pat. Nos. 3,647,434 and 3,647,435, respectively. In a particularly preferred form, such film units are employed in conjunction with a rupturable container, such as, that used above, containing the processing composition having the light-reflecting agent incorporated therein which container is adapted upon application of pressure of distributing its contents to develop the exposed film unit and to provide the light-reflecting layer.

As noted previously, the photographic use of the dyes of the present invention as optical filter agents to prevent post-exposure fogging of a selectively exposed photosensitive material is not limited to diffusion transfer processes nor to such processes employing composite photosensitive elements. While the use of such dyes in composite multicolor diffusion transfer film units is a particularly preferred embodiment of the present invention, these dyes may be used with equally effective results in any photographic process where it is desired to protect a photosensitive material from incident radiation actinic to the photosensitive material within the wavelength range capable of being absorbed by the dye. For example, the subject dyes may be used in conventional tray photographic processing as a component of the processing bath, or they may be present in a layer coextensive with one or both surfaces of a layer of photosensitive material to be processed using conventional tray procedures, provided that they are non-light-absorbing prior to photoexposure and also subsequent to developing the latent image unless the layer containing the dye is to be removed subsequent to processing. In such procedures, the photoexposed photosensitive material will, of course, be transferred from the camera to the processing bath in the absence of radiation actinic to the material.

The subject dyes also may be employed in diffusion transfer processes where the photosensitive and image-receiving elements are separated subsequent to the formation of a transfer image or where a spreader sheet is separated from the photosensitive element to reveal a final image in the negative. In addition to the composite diffusion transfer structures described above, the subject dyes may be used with composite diffusion transfer film units where the final image is to be viewed by transmitted light. Also they may be used in composite film units specifically adapted, for example, for forming a silver transfer image, for developing a negative silver image by monobath processing, for obtaining an additive color image, and for obtaining a dye image by the silver dye bleach process which structures are described in detail in aforementioned copending U. S. application Ser. No. 101,968, particularly with reference to FIGS. 10 to 13 of the application's drawings.

Although the invention has been discussed in detail throughout employing dye developers, the preferred image-providing materials, it will be readily recognized that other, less preferred, image-providing materials may be substituted in replacement of the preferred dye developers in the practice of the invention. For example, there may be employed dye image-forming materials such as those disclosed in U. S. Pat. Nos. 2,647,049; 2,661,293; 2,698,244; 2,698,798; 2,802,735; 3,148,062; 3,227,550; 3,227,551; 3,227,552; 3,227,554; 3,243,294; 3,330,655; 3,347,671; 3,352,672; 3,364,022; 3,443,939; 3,443,940; 3,443,941; 3,443,943; etc., wherein color diffusion transfer processes are described which employ color coupling techniques comprising, at least in part, reacting one or more color developing agents and one or more color formers or couplers to provide a dye transfer image to a superposed image-receiving layer and those disclosed in U. S. Pat. No. 2,774,668 and 3,087,817, wherein color diffusion transfer processes are described which employ the imagewise differential transfer of complete dyes by the mechanisms therein described to provide a transfer dye image to a contiguous image-receiving layer, and thus including the employment of image-providing materials in whole or in part initially insoluble or nondiffusible as disposed in the film unit which diffuse during processing as a direct or indirect function of exposure.

In view of the foregoing, it will be readily apparent that the subject dyes are useful generally in photographic processes for producing silver, monochromatic and multi-color images using any photosensitive material including conventional and direct positive silver halide emulsions. Depending upon the selected photosensitive material, one or more of the dyes may be used alone or in combination with another optical filter agent, such as another light-absorbing dye, which second dye may be non-color-changing or another pH sensitive dye. If the selected dye or dyes do not possess the desired stability in the processing composition for long term storage therein, they may be initially disposed in the film structure or stored in a double-compartmented pod or in one of two associated pods separate from the processing solution until such time as the pod(s) are ruptured whereupon the dyes are admixed with the processing solution.

Since certain changes may be made in the above product and process without departing from the scope of the invention herein involved, it is intended that all matter contained in the above description shall be interpreted as illustrative and not in a limiting sense.

What is claimed:

1. A photographic process comprising the steps of selectively exposing a photosensitive element comprising a layer of photosensitive material to radiation actinic thereto to provide a latent image therein, applying a processing composition to provide an indicator dye in a form capable of absorbing a predetermined wavelength range of radiation actinic to said photosensitive material, and developing said latent image while exposing said photosensitive element non-selectively to incident actinic radiation within said predetermined wavelength range, said indicator dye being present during development in a position and quantity effective to absorb said wavelength range of incident radiation in an amount sufficient to prevent any substantial increase, as a result of performing said process in the presence of incident radiation within said wavelength range, in the minimum density of the image obtained by said development of said latent image, and being selected from a 3,3-disubstituted phthalide and a 3,3-disubstituted naphthalide wherein the 3,3 substituents the same, are polycyclic aryl radicals containing the group,

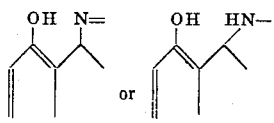

said radicals being bonded to said phthalide or naphthalide by a carbon atom para to the —OH of said group.

2. A process as defined in claim 1 wherein said indicator dye is initially disposed in said processing composition having a pH at which said indicator dye is light-absorbing, said processing composition being applied to said photosensitive layer and said composition containing said indicator dye being separated from the photosensitive layer subsequent to substantial image development.

3. A process as defined in claim 1 wherein said indicator dye is retained in said element and is rendered ineffective to prevent viewing of the final image subsequent to substantial image development by adjusting the pH of said indicator dyes environment to a value at which it is substantially non-light-absorbing.

4. A process as defined in claim 3 wherein said indicator dye is initially present in a processing composition permeable layer at a pH value at which it is substantially non-light absorbing, said layer being coextensive with at least one surface of said photosensitive layer and said processing composition applied thereto having a pH at which said indicator dye is light-absorbing.

5. A process as defined in claim 1 wherein said layer of photosensitive material is a silver halide layer.

6. A process as defined in claim 1 wherein said radicals of said indicator dye contain the group

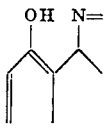

7. A process as defined in claim 6 wherein said radicals are 5-hydroxy-4-azaphenanthren-8-yl.

8. A process as defined in claim 7 wehrein said dye is a phthalide.

9. A process as defined in claim 1 wherein said indicator dye is di-(5-hydroxy-4-azaphenanthren-8-yl)7-carboxyphthalide.

10. A process as defined in claim 1 wherein said indicator dye is di-(3-sulfo-5-hydroxy-4-azaphenanthren-8-yl)7-carboxyphthalide.

11. A process of forming photographic diffusion transfer images which comprises, in combination, the steps of:
 a. exposing a photographic film unit which comprises a plurality of layers including an opaque support layer carrying a photosensitive silver halide layer having associated therewith a compound capable of providing as a function of development an imagewise distribution of an image-forming material which is processing composition soluble and diffusible as a function of the point-to-point degree of exposure of said silver halide layer and a diffusion transfer process image-receiving layer adapted to receive solubilized image-forming material diffusing thereto;
 b. contacting said photosensitive silver halide layer with an aqueous alkaline processing composition to provide an indicator dye in a form capable of absorbing a predetermined wavelength range of radiation actinic to said photosensitive material, said indicator dye being selected from a 3,3-disubstituted phthalide and a 3,3-disubstituted naphthalide wherein said 3,3 substituents, the same, are polycyclic aryl radicals containing the group,

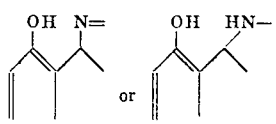

said radicals being bonded to said phthalide or naphthalide by a carbon atom para to the —OH of said group;
 c. effecting thereby development of said silver halide emulsion;
 d. forming thereby an imagewise distribution of diffusible image-forming material, as a function of the point-to-point degree of emulsion exposure; and
 e. transferring, by diffusion, at least a portion of said imagewise distribution of diffusible image-forming material to said layer adapted to receive said material to provide an image therein; said indicator dye being present during development in a position and quantity effective to absorb said wavelength range of actinic radiation in an amount sufficient to prevent any substantial decrease, as a result of performing said process in the presence of incident actinic light within said wavelength range, in the maximum density of the image obtained by the transfer of said diffusible image-forming material.

12. A process of forming transfer images as defined in claim 11 wherein said indicator dye is disposed, at a pH below its pKa, in a separate processing composition permeable layer and said photosensitive silver halide layer is positioned intermediate said opaque support and said layer containing said indicator dye.

13. A process of forming transfer images in color which comprises, in combination, the steps of:
 a. exposing a photographic film unit which is adapted to be processed by application of pressure to release and distribute a processing composition and which includes, in combination, a photosensitive element comprising a composite structure containing, as essential layers, in sequence, a first support layer opaque to incident actinic radiation; a photosensitive silver halide layer having associated therewith a compound capable of providing as a function of development an imagewise distribution of a dye image-forming material which is processing composition soluble and diffusible as a function of exposure of the photosensitive silver halide layer to actinic radiation; a polymeric layer dyeable by said dye image-forming material; a second support layer transparent to incident actinic radiation; and means securing said layers in substantially fixed relationship; means for interposing a reflecting agent and an indicator dye capable of absorbing incident radiation within a predetermined wavelength range actinic to said photosensitive layer at a pH above its pKa intermediate said dyeable polymeric layer and said photosensitive silver halide layer and associated dye image-forming material subsequent to photoexposure of said film unit, said indicator dye being selected from a 3,3-disubstituted phthalide and a 3,3-disubstituted naphthalide wherein said 3,3 substituents, the same, are polycyclic aryl radicals containing the group,

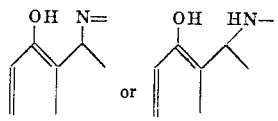

said radicals being bonded to said phthalide or naphthalide by a carbon atom para to the —OH of said group;

a rupturable container retaining an aqueous alkaline processing composition possessing a pH above the pKa of said indicator dye fixedly positioned and extending transverse a leading edge of said photosensitive element to effect unidirectional discharge of the container's processing composition intermediate said dyeable polymeric layer and the photosensitive silver halide layer next adjacent thereto upon application of compressive force to said container;

b. applying compressive force to said rupturable container to effect unidirectional discharge of the container's processing composition intermediate said dyeable polymeric layer and said photosensitive silver halide layer;

c. effecting thereby substantial development of said silver halide layer and disposition of said reflecting agent and said indicator dye at a pH above its pKa intermediate said dyeable polymeric layer and said photosensitive silver halide layer;

d. as a result of said development, forming an imagewise distribution of diffusible dye image-forming material, as a function of the point-to-point degree of exposure of said photosensitive layer;

e. transferring, by diffusion, at least a portion of said imagewise distribution of diffusible dye image-forming material to said dyeable polymeric layer to provide a dye image thereto; and f. maintaining said composite structure intact subsequent to said processing, said indicator dye being present in a quantity effective to absorb said wavelength range of incident radiation in an amount sufficient in combination with said reflecting agent, to prevent any substantial decrease, as a result of performing said process in the presence of incident actinic light within said wavelength range, in the maximum density of the image obtained by the transfer of said diffusible image-forming material.

14. A process of forming transfer images in color as defined in claim 13 wherein said indicator dye is initially disposed at a pH below its pKa in an aqueous alkaline processing composition permeable layer of said photosensitive element intermediate said dyeable polymeric layer and said silver halide layer, and said rupturable container containing said aqueous alkaline processing composition possessing a pH above the pKa of said indicator dye is fixedly positioned and extends transverse a leading edge of said photosensitive element to effect unidirectional discharge of the processing composition intermediate said dyeable polymeric layer and said layer containing said indicator dye upon application of compressive force to said container and including the step of discharging said processing composition, subsequent to exposure of said photosensitive element, intermediate said dyeable polymeric layer and said layer containing said indicator dye.

15. A process of forming transfer images in color as defined in claim 13 wherein said reflecting agent is titanium dioxide and said indicator dye and said titanium dioxide are initially disposed in said aqueous alkaline processing composition as retained in said rupturable container.

16. A process of forming transfer images in color as defined in claim 13 wherein said photosensitive element includes at least one acid reacting polymeric layer positioned intermediate at least one of (a) said first opaque layer and the photosensitive silver halide layer next adjacent thereto, and (b) said second transparent layer and the dyeable polymeric layer next adjcaent thereto, and contains sufficient acidifying function to effect reduction of said aqueous alkaline processing composition from a pH above to a pH below the pKa of said indicator dye and including the step of transferring, by diffusion, subsequent to substantial transfer dye image formation, a sufficient portion of the ions of said processing composition to said polymeric acid layer to thereby reduce said pH to a pH below said pKa.

17. A process of forming transfer images in color as defined in claim 16 wherein said dye-image forming material comprises a dye which is a silver halide developing agent and said photosensitive layer is a silver halide emulsion.

18. A process of forming transfer images in color as defined in claim 17 wherein said photosensitive element comprises at least two selectively sensitized silver halide emulsion layers, each of said layers having associated therewith an image-forming dye, which is a silver halide developing agent, of predetermined color, and is soluble and diffusible, in aqueous alkaline processing composition as a function of the point-to-point degree of exposure of the respective emulsion associated therewith.

19. A process of forming transfer images in color as defined in claim 13 wherein said photosensitive element comprises three selectively sensitized silver halide emulsion layers on said support, in sequence, a red-sensitive silver halide emulsion layer having associated therewith a cyan image-forming dye; a green-sensitive silver halide emulsion layer having associated therewith a magenta image-forming dye; a blue-sensitive silver halide emulsion layer having associated therewith a yellow image-forming dye; each of said cyan, magenta and yellow image-forming dyes being silver halide developing agents and soluble and diffusible in said aqueous alkaline processing solution.

20. A process as defined in claim 13 wherein said radicals of said indicator dye contain the group,

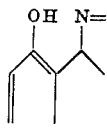

21. A process as defined in claim 20 wherein said radicals are 5-hydroxy-4-azaphenanthren-8-yl.

22. A process as defined in claim 21 wherein said dye is a phthalide.

23. A process as defined in claim 13 wherein said indicator dye is di-(5-hydroxy-4-azaphenanthren-8-yl)7-carboxyphthalide.

24. A process as defined in claim 13 wherein said indicator dye is di-(3-sulfo-5-hydroxy-4-azaphenanthren-8-yl)7-carboxyphthalide.

25. A photographic film unit which comprises a pluarlity of layers including a support layer carrying on one surface, in order, a layer of photosensitive material and a layer comprising an indicator dye disposed at a pH below its pKa selected from a 3,3-disubstituted phthalide and a 3,3-disubstituted naphthalide wherein said 3,3 substituents, the same, are polycyclic aryl radicals containing the group,

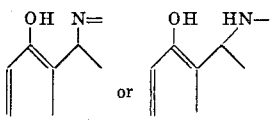

said radicals being bonded to said phthalide or naphthalide by carbon atom para to the —OH of said group.

26. A photographic film unit as defined in claim 25 wherein said photosensitive material is silver halide.

27. A photographic film unit as defined in claim 26 wherein said silver halide layer has associated therewith a silver halide developing agent.

28. A photographic film unit as defined in claim 26 wherein said silver halide layer has associated therewith a dye-providing compound capable of providing as a function of development an imagewise distribution of a dye image-forming material which is processing composition soluble and diffusible as a function of the point-to-point degree of exposure of said silver halide layer.

29. A photographic film unit as defined in claim 28 which is adapted to be processed by application of pressure to release and distribute a processing composition and which comprises, in combination:
a photosensitive element including a composite structure containing, as essential layers, in sequence, a first support layer opaque to incident actinic radiation; at least two selectively sensitized silver halide layers, each having associated therewith an image-forming dye which is a silver halide developing agent of predetermined color, each of said dyes being soluble and diffusible in alkaline processing composition as a function of the point-to-point degree of exposure of the respective silver halide associated therewith, a polymeric layer dyeable by said dye; a second support layer transparent to incident actinic radiation; and means securing said layers in substantially fixed relationship;
a rupturable container retaining an alkaline processing composition containing reflecting agent fixedly positioned and extending transverse a leading edge of said photosensitive element to effect unidirectional discharge of said container's processing composition between said dyeable polymeric layer and the photosensitive silver halide layer next adjacent thereto upon application of pressure to said container; and an indicator dye capable of absorbing incident radiation within a predetermined wavelength range actinic to said silver halide disposed in at least one of said processing composition and, at a pH below its pKa, in a layer intermediate said photosensitive silver halide layer and said second support layer transparent to incident actinic radiation, said indicator dye being selected from a 3,3-disubstituted phthalide and a 3,3-disubstituted naphthalide wherein said 3,3 substituents, the same, are polycyclic aryl radicals containing the group,

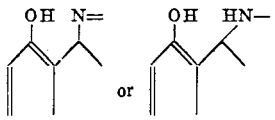

said radicals being bonded to said phthalide or naphthalide by a carbon atom para to the —OH of said group.

30. A photographic film unit as defined in claim 29 including at least one acid reacting polymeric layer positioned intermediate at least one of said first opaque layer and the photosensitive silver halide layer next adjacent thereto, and said second transparent layer and the dyeable polymeric layer next adjacent thereto, said polymeric acid layer containing sufficient acidifying function to effect reduction of said processing composition from a first pH at which said image-forming dye is substantially soluble and diffusible to a second pH at which said image-forming dye is substantially nondiffusible.

31. A photographic film unit as defined in claim 30 wherein said reflecting agent taken together with said indicator dye are adapted to prevent further exposure of the selectively exposed silver halide layer during processing in the presence of radiation within said predetermined wavelength range actinic to the silver halide layer and incident on the surface of the film unit opposite to the opaque support layer.

32. A photographic film unit as defined in claim 31 wherein said photosensitive element includes, as essential layers, in sequence, from said opaque support layer, an alkaline solution permeable polymeric layer containing a cyan dye; a red-sensitive silver halide emulsion layer; an alkaline solution permeable polymeric layer containing a magenta dye; a green-sensitive silver halide emulsion layer; an alkaline solution permeable polymeric layer containing a yellow dye; a blue-sensitive silver halide emulsion layer, each of said cyan, magenta and yellow dyes being silver halide developing agents and being soluble and diffusible, in aqueous alkaline solution at said first pH and substantially insoluble in aqueous alkaline solution at said second pH.

33. A film unit as defined in claim 29 wherein said radicals of said indicator dye contain the group;

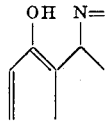

34. A film unit as defined in claim 33 wherein said radicals are 5-hydroxy-4-azaphenanthren-8-yl.

35. A film unit as defined in claim 34 wherein said dye is a phthalide.

36. A film unit as defined in claim 29 wherein said indicator dye is di-(5-hydroxy-4-azaphenanthren-8-yl)7-carboxyphthalide.

37. A film unit as defined in claim 29 wherein said indicator dye is di-3-sulfo-5-hydroxy-4-azaphenanthren-8-yl) 7-carboxyphthalide.

38. A photographic processing composition comprising an aqueous alkaline solution of a viscosity imparting reagent, a light-reflecting agent and an indicator dye selected from a 3,3-disubstituted phthalide and a 3,3-disubstituted naphthalide wherein said 3,3 substituents, the same, are polycyclic aryl radicals containing the group,

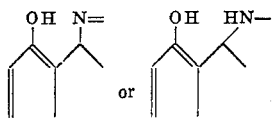 or said radicals being bonded to said phthalide or naphthalide by a carbon atom para to the —OH of said group.

39. A photographic processing composition as defined in claim 38 which additionally contains a silver halide developing agent.

40. A composition as defined in claim 38 wherein said radicals of said indicator dye contain the group,

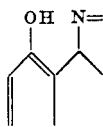

41. A composition as defined in claim 40 wherein said radicals are 5-hydroxy-4-azaphenanthren-8-yl.

42. A composition as defined in claim 41 wherein said dye is a phthalide.

43. A composition as defined in claim 38 wherein said indicator dye is di-(5-hydroxy-4-azaphenanthren-8-yl)7-carboxyphthalide.

44. A composition as defined in claim 38 wherein said indicator dye is di-(3-sulfo-5-hydroxy-4-azaphenanthren-8-yl)7-carboxyphthalide.

45. A composition as defined in claim 38 wherein said aqueous alkaline solution has a pH above the pKa of said indicator dye.

* * * * *